US010039004B2

(12) United States Patent
Cook

(10) Patent No.: US 10,039,004 B2
(45) Date of Patent: *Jul. 31, 2018

(54) PROXIMITY SECURITY TOKENS

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,584

(22) Filed: Jun. 5, 2017

(65) Prior Publication Data
US 2017/0272954 A1    Sep. 21, 2017

Related U.S. Application Data

(63) Continuation of application No. 14/693,031, filed on Apr. 22, 2015, now Pat. No. 9,693,234.

(60) Provisional application No. 61/982,713, filed on Apr. 22, 2014.

(51) Int. Cl.
H04L 29/06 (2006.01)
H04W 12/12 (2009.01)
(52) U.S. Cl.
CPC .................................. H04W 12/12 (2013.01)
(58) Field of Classification Search
CPC .................................................... H04W 12/12
See application file for complete search history.

(56) References Cited

U.S. PATENT DOCUMENTS

| 3,906,460 | A  | 9/1975  | Halpern       |
|-----------|----|---------|---------------|
| 7,084,734 | B2 | 8/2006  | Singh         |
| 7,128,274 | B2 | 10/2006 | Kelley et al. |
| 8,893,284 | B2 | 11/2014 | Sadler        |
| 9,693,234 | B2 | 6/2017  | Cook          |
| 2003/0093693 | A1 | 5/2003 | Blight    |
| 2005/0090267 | A1 | 4/2005 | Kotzin    |
| 2005/0105734 | A1 | 5/2005 | Buer      |
| 2005/0221798 | A1 | 10/2005 | Sengupta |
| 2007/0297609 | A1 | 12/2007 | Adams    |

(Continued)

OTHER PUBLICATIONS

U.S. Appl. No. 14/693,031; Non-Final Rejection dated Aug. 22, 2016; 22 pages.

(Continued)

*Primary Examiner* — Shawnchoy Rahman
(74) *Attorney, Agent, or Firm* — Swanson & Bratschun, L.L.C.

(57) ABSTRACT

Disclosed embodiments comprise one or more security methods, systems or apparatus suitable to provide additional security to personal property or financial transactions. Embodiments feature a proximity security token which is physically separate from a protected device. A communications link is provided between the proximity security token and the protected device which communications link operates over a limited range. Thus, the presence and active operation of the limited range communications link between the proximity security token and protected device indicates that the protected device has not been lost and stolen. Interruption of the communications link indicates that the protected device may have been lost or stolen causing the commencement of security actions.

16 Claims, 11 Drawing Sheets

(56) References Cited

U.S. PATENT DOCUMENTS

| | | |
|---|---|---|
| 2008/0319911 A1 | 12/2008 | Faith et al. |
| 2009/0156126 A1 | 6/2009 | Willis |
| 2010/0241536 A1 | 9/2010 | Tanaka |
| 2011/0092159 A1* | 4/2011 | Park .................. H04L 63/102 |
| | | 455/41.2 |
| 2013/0030931 A1 | 1/2013 | Moshfeghi |
| 2013/0036017 A1 | 2/2013 | Galloway |
| 2013/0124346 A1 | 5/2013 | Baldwin et al. |
| 2015/0215734 A1 | 7/2015 | Colangelo |
| 2015/0227903 A1 | 8/2015 | Votaw et al. |
| 2015/0304291 A1 | 10/2015 | Cook et al. |
| 2016/0147988 A1 | 5/2016 | Mutz et al. |

OTHER PUBLICATIONS

U.S. Appl. No. 14/693,031; Notice of Allowance dated Feb. 27, 2017; 33 pages.

* cited by examiner

PROXIMITY SECURITY TOKENS

CROSS-REFERENCES TO RELATED APPLICATIONS

This application is a continuation application of U.S. patent application Ser. No. 14/693,031 filed Apr. 22, 2015 by Charles I. Cook, entitled, "Proximity Security Tokens," which claims priority to U.S. Provisional Patent Application Ser. No. 61/982,713 filed Apr. 22, 2014 by Charles I. Cook, entitled, "Proximity Security Tokens," the entire teachings of which are incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for providing personal property and financial transaction security using physical or virtual proximity security tokens.

BACKGROUND

Personal property items have always been the subject of theft. In addition, since the beginning of electronic commerce, financial information, credit cards, access codes and personal identification numbers (PIN numbers) have increasingly become targets for theft. Various solutions have been devised to minimize personal property and financial information theft. For example, personal property can be embedded with electronic tracking devices which enable the owner of the personal property or law enforcement authorities to track stolen property. Various user codes, algorithms, biometric identification schemes and the like have been devised to mitigate the theft of financial information. All known security solutions are unfortunately subject to manipulation or disabling by creative thieves. Hence, there is a need for more robust and effective personal property and financial information security apparatus and techniques.

BRIEF SUMMARY

Various embodiments disclosed herein comprise one or more security methods suitable to provide additional security to personal property or financial transactions. Disclosed method embodiments include the steps of providing a proximity security token which is physically separate from a protected device. The term "protected device" is used herein as a matter of convenience to generically describe any type of personal property which may be protected according to the disclosed methods whether or not the article of personal property is an electronic device.

Method embodiments further include providing a communications link between the proximity security token and the protected device. The communications link provides for typically wireless communication between the proximity security token and the protected device over a selected and limited communications range. In addition, in embodiments where the protected device has electronic functionality, one or more protected device operations are enabled when the communications link is active. On the contrary, when the communications link is interrupted; one or more security actions are caused to occur. Thus, the presence and active operation of the limited range communications link between the proximity security token and protected device indicates that the protected device has not been lost and stolen. On the other hand, the interruption of the communications link, after it has been activated, indicates that the protected device may have been lost or stolen.

The security actions which are triggered when communications between the proximity security token and protected device are interrupted include but are not limited to the following: disabling one or more aspects of device functionality, sounding an alarm at or near the proximity security token, and/or enabling or continuing tracking of the protected device.

In certain embodiments, the protected device is an article of personal property having no electronic functionality. In such embodiments, the disclosed methods may further include associating a protected device module with the article personal property. The protected device module will include electronic elements as necessary to communicate with a proximity security token over the communications link In other embodiments, the protected device is a financial transaction card, for example a credit card, debit card, driver's license, personal identification card, smart phone, smart watch, memory stick or other device which is utilized to initiate or consummate a financial transaction of any type. In such embodiments, the enabled device operations when the communications link is operating include data transfer operations. The security actions taken when communications between the proximity security token and the financial transaction card are interrupted may include disabling data transfer operations between the financial transaction card and any point-of-sale device or other third-party device required to complete the financial transaction.

In some embodiments the proximity security token is a physical apparatus and method embodiments include the steps of concealing the proximity security token within an article of clothing or the like. In other embodiments, the proximity security token is a virtual tag and the communications link is a network communications link. In virtual token embodiments, the method embodiments may further include virtually associating the proximity security token with a selected geographic region. A virtual proximity security token may be associated with a geographic region using a user interface and mapping program.

In addition, methods involving virtual proximity security tokens will include the steps of detecting the presence or absence of the protected device within (or outside of) the geographic region using various detection methods. Detection methods include but not limited to pico cell, femto cell, regional cell or wide range cell based detection methods, cellular tower triangulation or GPS location detection methods.

In some embodiments, particularly where the protected device is a financial transaction card, method embodiments may further include providing a communications link between the proximity security token and a third-party apparatus such as a point-of-sale device. Alternatively the communications link may be between a point-of-sale device and the financial transaction card or multiple-way communication may be facilitated between at least the proximity security token the point-of-sale device and a financial transaction card. Authentication codes may be transmitted between any two or more of the proximity security token, a point-of-sale device, a protected device including but not limited to a financial transaction card and a third party such as a bank or merchant.

Communications between the proximity security token, protected device and or a third-party device may occur continuously, semi-continuously, periodically, at specific times or on specific dates. Thus the security measures described herein may be implemented continuously or over selected time periods.

Alternative embodiments disclosed herein include systems and proximity security token apparatus embodiments providing for the above described functionality.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments include methods, devices, apparatus and systems providing for personal property and/or financial information security. As used herein personal property is any tangible asset of any size that may be owned by an individual, business or other legal entity. The various embodiments feature methods or systems utilizing one or more proximity security tokens. A proximity security token may be a physical device or a virtual tag. In embodiments where the proximity security token is a physical device, the proximity security token may be a small, relatively unobtrusive, electronic device which can be easily carried by or concealed by a user. A virtual proximity security token is a virtual tag associated with a location using one or more networks as described in detail below.

Figure 1:
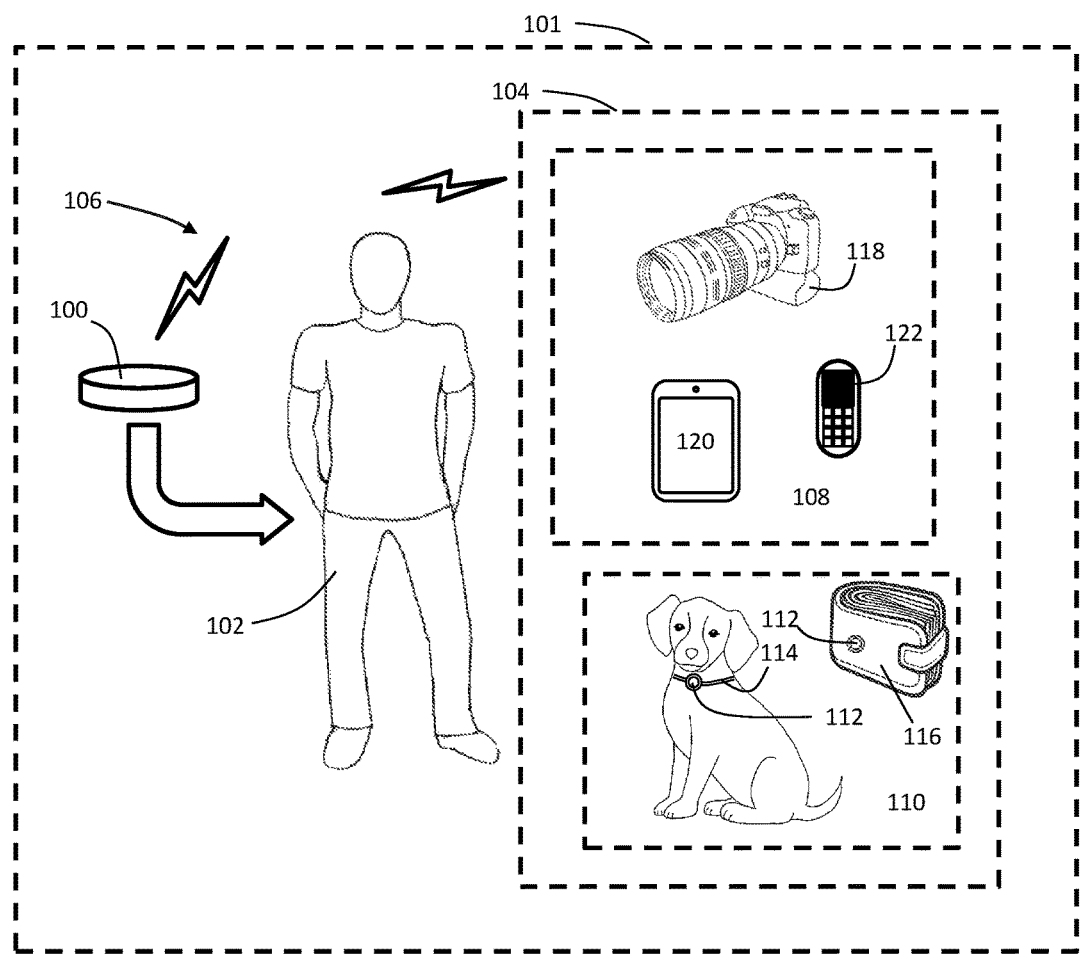
FIG. 1 is a schematic diagram illustrating a system providing personal property security using a physical proximity security token.

In the FIG. 1 embodiment, a physical proximity security token 100 provides personal property security within a system 101. The proximity security token 100 may be carried by a user 102 in his or her pocket, wallet, purse, concealed in an article of clothing such as a belt or shoe, embedded under the skin, worn as a patch or otherwise associated with the user 102. Therefore, the proximity security token 100 may advantageously be implemented as a relatively small and unobtrusive device sized and shaped to be easy to carry and or/conceal. For example, the proximity security token 100 may be shaped in any convenient manner including but not limited to coin or poker chip shapes, credit card formats or other formats. The proximity security token 100 of FIG. 1 is shown in a greatly enlarged fashion to facilitate illustration.

In the FIG. 1 embodiment, the proximity security token 100 will be associated with a protected device 104. As illustrated in FIG. 1, the protected device 104 is physically separate from the proximity security token 100. The proximity security token 100 and the protected device 104 are in communication with each other however over a communications link 106. The communications link 106 may be implemented with any communications method including but not limited to a variation of Bluetooth, Near Field Communications technologies and/or RFID technologies. The power supply supporting the communications link 106 may be included in the proximity security token 100 or the protected device 104 with the other of the proximity security token 100 or the protected device being implemented passively and powered inductively. Alternatively, both the proximity security token 100 and the protected device 104 may have power supplies and transmission electronics as required to actively support the communications link 106.

The protected device 104 may generally fall into one of two broad categories; electronic protected devices 108 or non-electronic protected devices 110. Electronic devices 108 may innately have or be provided with circuitry, power supplies, processors, antennas and other modules as required to communicate with the proximity security token 100. Alternatively, a separate or supplemental protected device module 112 may be associated with the electronic device 108 at a later time. Typically, non-electronic protected devices 110 will require the addition or attachment of a protected device module 112 before the disclosed proximity security token methods may be implemented.

In the FIG. 1 illustration, a camera, tablet computer and cellular telephone are illustrated as representative electronic protected devices 108. A dog and wallet are illustrated as representative non-electronic protected devices 110. Although the word "devices" is used for convenience in referring generically to the class of protected devices 104, any article of personal property, including without limitation animals, garments, jewelry, books, wallets, bags, large or small electronics, bicycles, art, furniture, sporting goods, vehicles and other items of personal property without limitation can qualify as a protected device 104, provided the article of personal property includes or is associated with a protected device module 112 for communicating with a physically separate proximity security token 100. See, for example, the protected device module 112 attached to the dog's collar 114 or the protected device module 112 concealed by sewing into the leather cover of the wallet 116.

As noted above, the proximity security token 100 and the protected device 104 may communicate with each other over the communications link 106. Communication between the proximity security token 100 and the protected device 104 is typically accomplished wirelessly and must occur over a limited range. For example, Bluetooth, Near Field Communications technologies and/or RFID wireless communication technologies have a range of less than several meters. In certain instances, the communications link 106 may be provided with a very short communications range, which is advantageous for protecting financial transaction data or cards as described below. In other instances, the communications link 106 may be provided with a medium range of one to several tens or hundreds of meters. The embodiments disclosed herein are not limited to any particular communications link range 106, provided the communications link 106 does have a limited range.

Furthermore, communications between any type are protected device 104, and the proximity security token 100 may occur continuously, over short discrete periods of time, at predefined intervals, initiated on an as-needed basis or according to any other schedule which enhances system operation and/or increases security as described herein.

Figure 2:
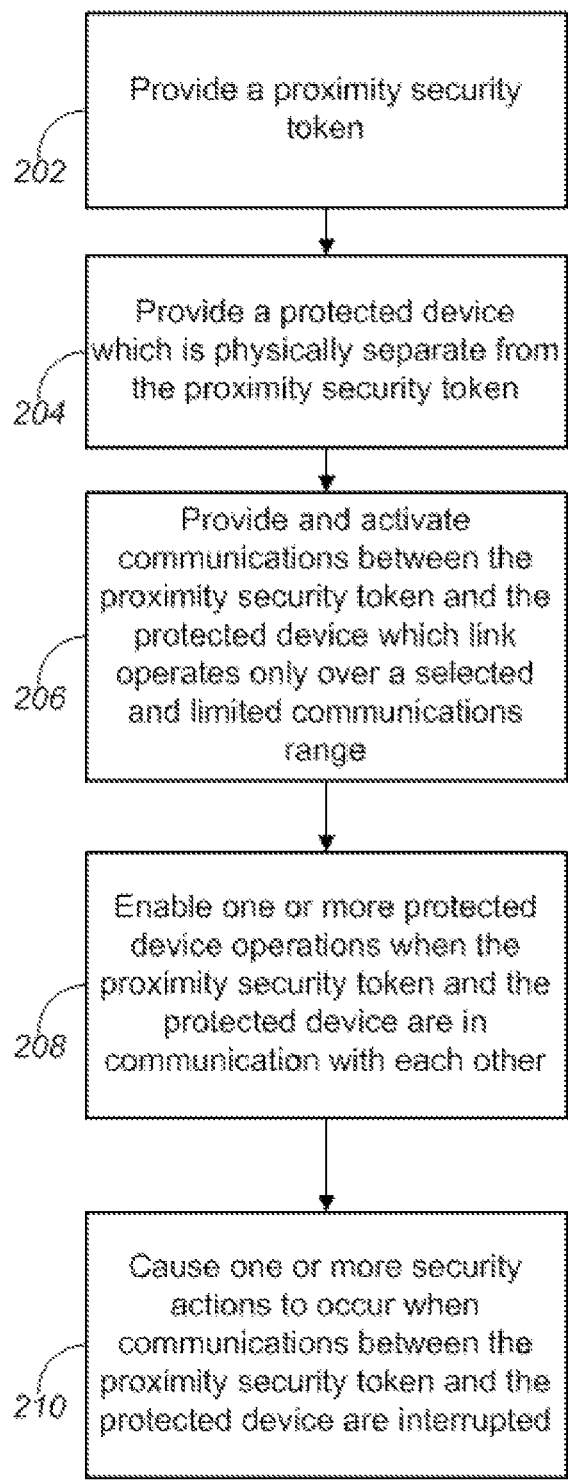
FIG. 2. Is a flow diagram illustrating a method for providing personal property security using a physical proximity security token.

In use, after the proximity security token 100 and the protected device 104 are activated as described herein, active communications across the communications link 106 will occur, provided the proximity security token 100 and the protected device 104 are within the selected limited range of each other. In this configuration, when the token and device are within range and in communication with each other, it is presumed that the protected device has not been lost or stolen and no security actions are taken. For example, as illustrated in FIGS. 1 and 2, a user 102 may have a proximity security token 100 on his person, for example sewn into the leather of his belt. The user 102 may also be carrying a camera 118 which includes circuitry for communication with the proximity security token 100 over the communications link 106. At a previous point in time, the user 102, using a user interface as described in detail below, will have linked or synchronized the proximity security token 100 with the protected device module 112 within or attached to the camera 118 (Steps 202-206 of FIG. 2).

Later, in this embodiment, when the camera is turned on, software and hardware within the camera, or software and hardware associated with a protected device module 112 associated with the camera, query the proximity security token 100 via an encrypted message based on a pre-established internal key of the camera. Upon establishment of the communications link 106, the token's authentication key may be communicated. The key is typically encrypted based on an encrypted request received from the camera. Accordingly, a private key may be set up during the earlier linking or synchronization process. If the key is determined to be correct, normal camera operations (or a selected feature of normal camera operation) will be enabled. Periodic, continuous or semi-continuous checks are made between the proximity security token 100 and the protected device, i.e the camera 118, to verify that the proximity security token 100 is still within close proximity to the camera 118.

Thus, assuming, that the protected device 104 is an electronic device 108, the system and method may include hardware and or software which enable one or more "normal" protected device operations when the proximity security token 100 and the protected device 108 are in communication with each other (Step 208). In the above example, the camera 118 may be enabled to power on, focus, take pictures or perform one or more other types of normal operations. The nature of the normal operation(s) enabled by the communications link 106 with the proximity security token 100 will depend upon the nature of the device.

At some point in time however, the communications link 106 between the proximity security token 100 and the protected device 104 may be broken. A failure of the communications link between the proximity security token 100 and protected device 104 will indicate that the protected device 104 is no longer within the selected communications range of the proximity security token 100. Thus, this condition will occur if the protected device 104 has been lost or stolen. When the communications link 106 is interrupted, one or more security actions may be caused to occur (Step 210).

Representative security actions include but are not limited to the following; an alarm may be caused to sound within the proximity security token 100 or from an alarm module associated with the proximity security token 100. The alarm will alert the user 102 that the protected device 104 is no longer within communications range and may have been lost or stolen. In addition, particularly if the protected device 104 is an electronic device 108, one or more aspects of the electronic operation of the protected device 104 may be disabled. For example, if the protected device is a camera 118, the camera may be disabled from powering on, focusing, taking pictures or otherwise prohibited from performing one or more normal operations when the communications link 106 between the security token 100 and the protected device module 112 within or attached to the camera 118 is interrupted. Similar security actions, depending on the device nature, may be caused to occur with respect to other types of protected electronic device 108, which security actions wholly or partially disable electronic device operation when the communications link 106 is broken.

In addition, the protected device module 112 or other circuitry associated with a protected electronic device 108 may begin (or continue) to transmit a tracking signal according to one or more known tracking signal technologies to assist the user 102 or law enforcement authorities with the tracking and recovery of the protected device.

The above personal property security systems may be made more robust by placing the protected device 104 into communication with multiple proximity security tokens 100. A multiple token embodiment prevents a thief from defeating the system by stealing both the protected device 104 and a single proximity security token 100.

Figure 3:
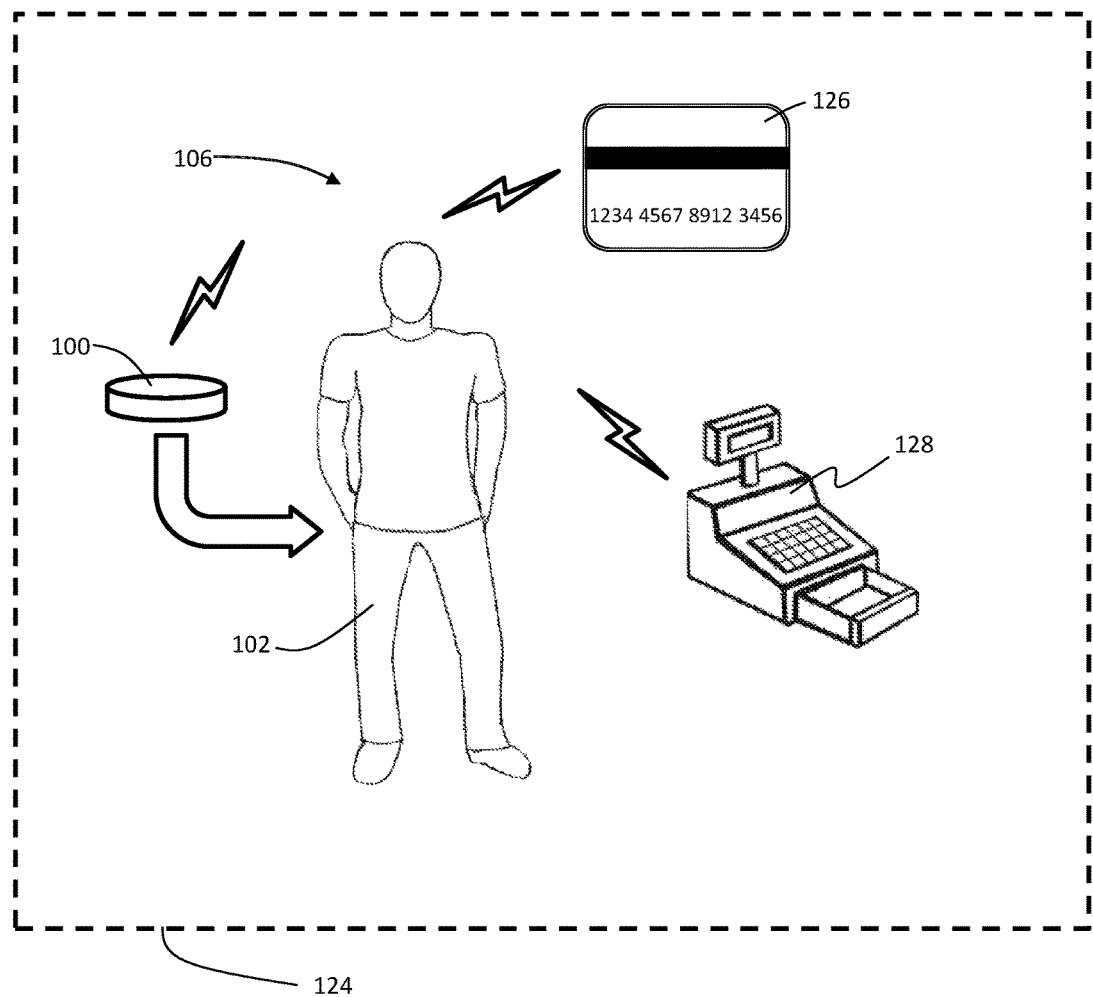
FIG. 3 is a schematic diagram illustrating a system providing financial transaction security using a physical proximity security token.

As noted above, a physical proximity security token 100 may also be utilized to provide financial transaction security. In one system embodiment 124, as shown in FIG. 3, a proximity security token 100 carried by a user 102 as described above is placed into communication with a financial transaction card 126. Communication between the proximity security token 100 and the financial transaction card 126 is accomplished utilizing a range-limited communications link 106 much as described above. In the system 124 however, the protected device is specifically a financial transaction card 126 which could, for example, be a credit card, a debit card, a personal identification card, a driver's license, a passport, a memory dongle, a memory stick, a smart phone, a smart watch, a biometric identification apparatus or other device or credential which can be used to authenticate, execute or document any type of financial transaction.

Figure 4:
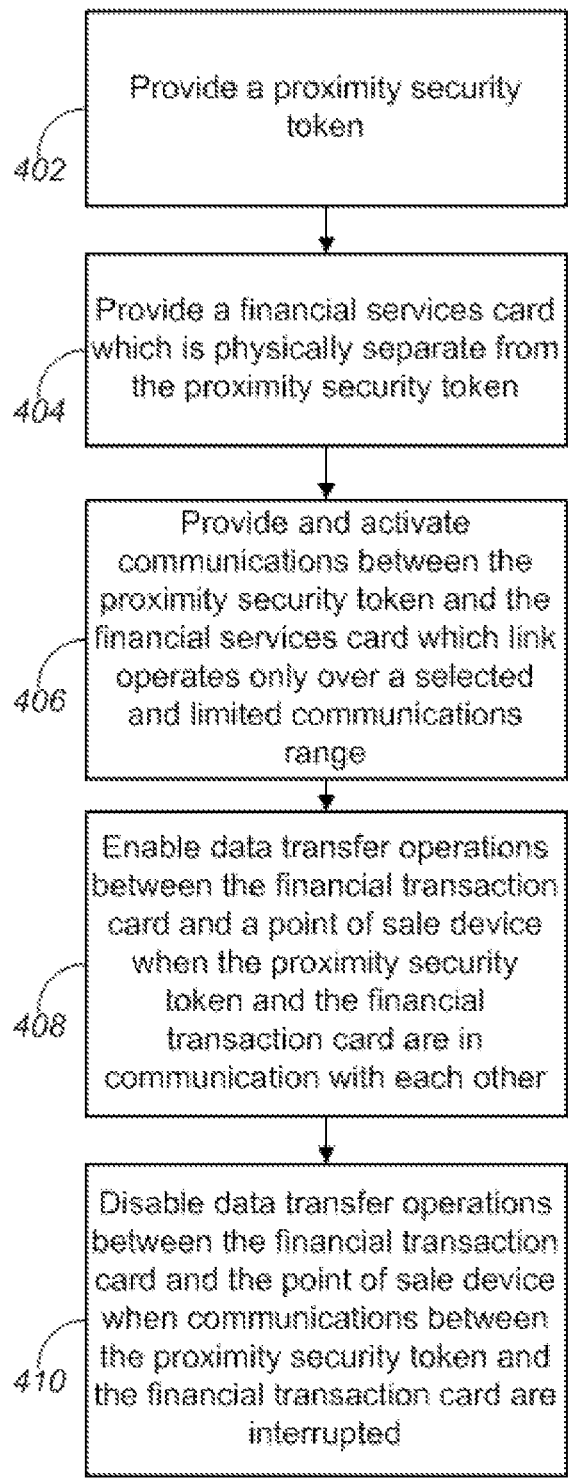
FIG. 4 is a flow diagram illustrating a method for providing financial transaction security using a physical proximity security token.

The financial transaction card 126 may include active wireless communications functionality or may be implemented with a passive reader activated tag. In either case, as shown in FIG. 4, supplemental financial transaction security may be provided by activating a limited range communications link between the proximity security token 100 and the financial transaction card 126 (FIG. 4, steps 402-406). In this embodiment, when communications are active between the proximity security token 100 and the financial transaction card 126, data transfer operations between the financial transaction card and a point-of-sale device 128 are enabled (Step 408). The point-of-sale device 128 may be, but is not limited to, a cash register, a financial transactions kiosk, a commercial computer terminal, a card reader, a personal computer, a smart phone or any other merchant-side interface configured to receive financial transaction data.

Another additional level of security may be achieved by requiring the point-of-sale device 128 to also be in communication (typically wireless communications) with either the proximity security token 100 and/or the financial transaction card 126 or both before a transaction is authorized. Thus, three-way communications or communications between the point-of-sale device 128 and at least one of the financial transaction card 126 or the proximity security token 100 may be required before data is transmitted between the financial transaction card 126 and the point-of-sale device or after data is transmitted but before the transaction is authorized.

Communication between the point-of-sale device 128, proximity security token 100 and/or the financial transaction card 126 may be powered and supported in many possible alternative configurations. In certain embodiments, the financial transaction card 126 may be a passive device. The point of sale device 128 will typically be equipped with one or more types of input device to read information from a magnetic strip, RFID or other reader activated tag on the financial transaction card 126. Before a financial transaction is completed, the point-of-sale device 128 may communicate with the bank, merchant or other financial institution associated with the financial transaction card 126 to solicit encrypted information required to communicate with the proximity security token 100 carried by the user 102. Thus, in some embodiments the proximity security token communicates directly with the point-of-sale device without requiring direct communication with the financial transaction card 126. As each successive customer completes a transaction, the point-of-sale device solicits the required codes necessary to communicate with that customer's individual proximity security token 100.

In any of the above embodiments, RFID or another passive reader activated tag technology may be used to power components of the financial transaction card 126 or the proximity security token 100 through inductive RFID coupling or another means. Furthermore, communications between any type of protected device, including but not limited to a financial transaction card, and a proximity security token 100 or another device such as the point-of-sale device 128 may occur continuously, over short discrete periods of time, at predefined intervals, initiated on an as-needed basis or according to any other schedule which enhances system operation and/or increases security.

As described above with respect to personal property, interruption of the limited range communications link 106 between the user's proximity security token 100 and the financial transaction card 126 indicates that the financial transaction card 126 has been lost or stolen. Therefore, upon interruption of communications over the communications link 106, data transfer operations between the financial transaction card and the point-of-sale device 128 are disabled (Step 410). If the financial transaction card 126 has active circuitry, data transfer operations may be directly disabled from within the financial transaction card 126. Thus, if the financial transaction card 126 is a cell phone (for example) used to transmit financial data, an internal processor may be triggered to prohibit transmission. Alternatively, and particularly if the financial transaction card 126 as a passive device, instructions communicated over a network to the point of sale device 128 from a bank, credit card company or other financial institution associated with the financial transaction card 126 may prohibit the consummation of a financial transaction or cause data transfer operations using the financial transaction card 126 to be suspended or terminated.

Additional security actions may also be taken when a financial transaction card 126 is deemed to be lost or stolen through termination of the communications link 106. Additional security actions include but are not limited to the sounding of alarms at or near the proximity security token 100, the enabling or continuation of tracking functionality and/or other measures.

Additional security may also be obtained by causing the financial transaction card 126 to be in communication with multiple proximity security tokens 100. For example, a safe-deposit box which is opened with a card-key (the card-key being a type of financial transaction card 126) may be configured such that the card-key only communicates opening instructions to the safe-deposit box if a proximity security token 100 maintained by a user 102 and another proximity security token 100 maintained by a bank employee are in communication with the card-key.

Figure 5:
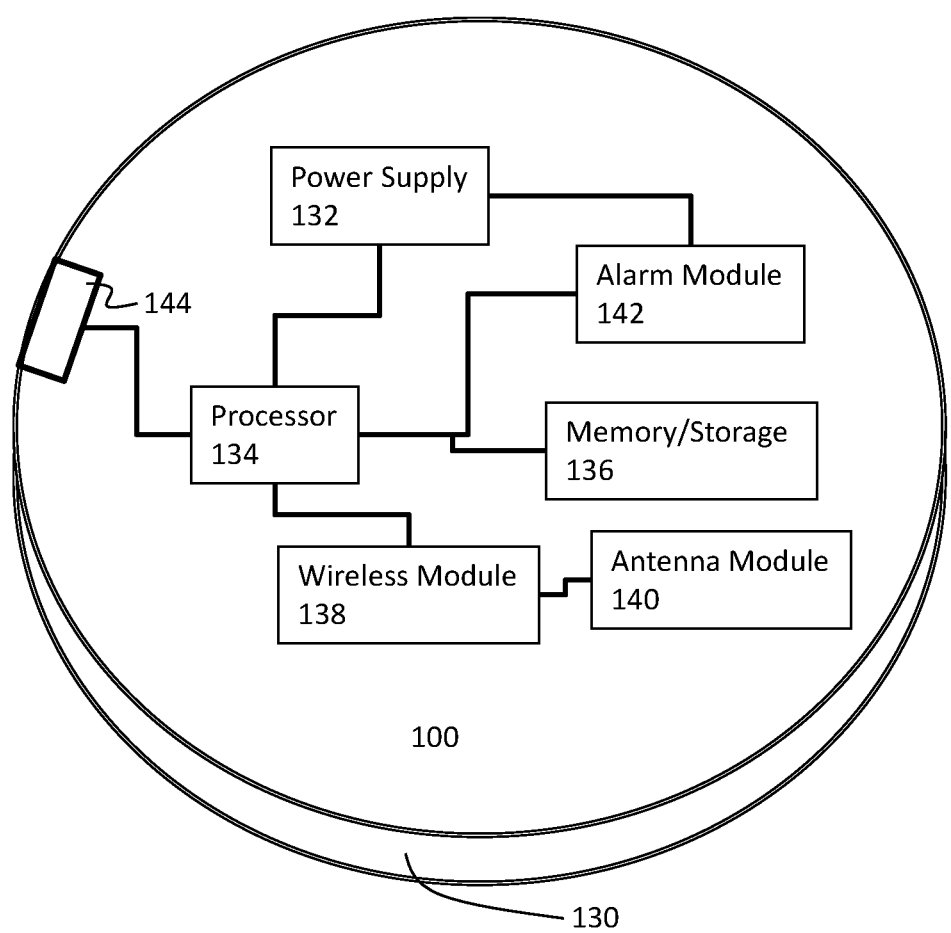
FIG. 5 is a schematic diagram illustration of a representative physical proximity security token.

FIG. 5 is a schematic illustration of a representative physical proximity security token 100, such as described above with respect to FIGS. 1-4. As noted above, the proximity security token 100 may be of any desired size and shape, although in certain embodiments it is advantageous to have the proximity security token 100 implemented in a form which is small enough to easily carry and/or conceal. Accordingly, a physical proximity security token 100 will include a housing 130 which contains and supports internal electronic components.

The internal electronic components include, but are not limited to, a power supply 132 which may be implemented with a battery, or, in alternative embodiments, the power supply may be implemented with an antenna or other apparatus which is suitable for the inductive coupling of radio frequency energy from an outboard device having a power supply. Thus, in certain embodiments the proximity security token 100 may be a passive device which is powered externally in a manner which is similar to the powering of RFID tags and other inductively powered apparatus.

In addition, the proximity security token 100 will include logic implemented by a processor 134. The logic may be stored in memory 136. The processor 134 will receive and send communications, typically wireless communications, as described above through wireless communications module 138 and antenna 140.

As noted above, when the communications link 106 between a proximity security token 100 and a protected device 104 is interrupted, security actions which may include, but which are not limited to the sounding of an alarm may be triggered. Therefore the proximity security token 100 may optionally include an alarm module 142 or a communication pathway to an external alarm system. The processor 134 may communicate with an external computer or other user interface for configuration and programming through the wireless communications module 138 and antenna 140 or through a wired connection, for example a USB port 144. The USB port 144, when included, may also be used to charge the power supply 132.

Figure 6:
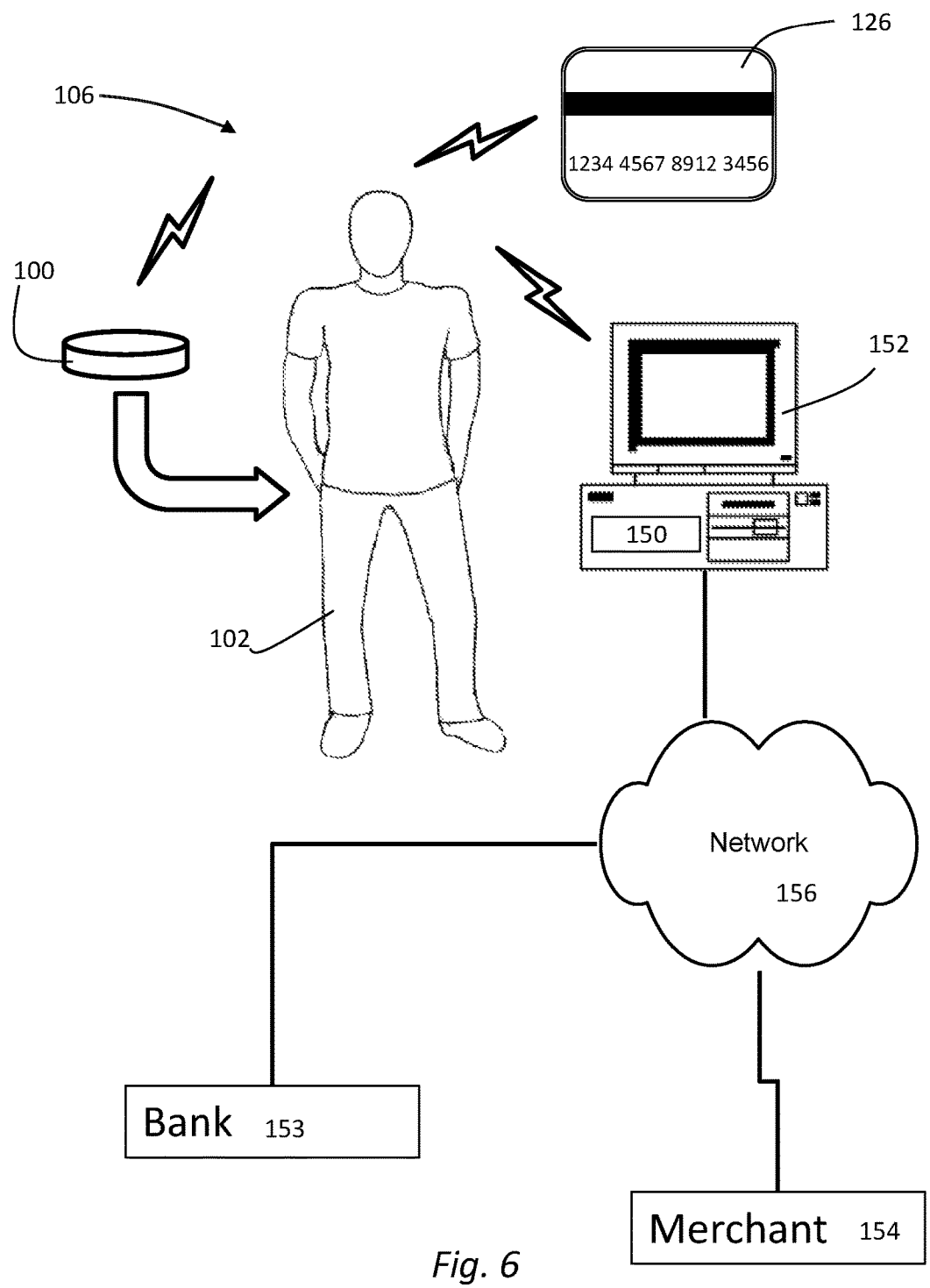
FIG. 6 is a schematic diagram illustrating a system providing online financial transaction security using a physical proximity security token.

In certain embodiments, a physical proximity security token 100 may be used to provide additional security for online or telephonic financial transactions where the proximity security token 100 is far removed from any point-of-sale device. For example, as shown in FIG. 6, in one online embodiment a secure application 150 is provided running on the user's computer, tablet, smart phone or other network accessing device 152. The secure application 150, among other operations, communicates authentication information with a bank 153, credit card company, or other issuer of a financial transaction card 126 and with a merchant 154, with whom the user 102 seeks to do business. The secure application 150 running on the user's network accessing device 152 also communicates with a proximity security token 100 maintained by the user 102 as described above. Through this three-way communication, the user 102 may enter the account number of the financial transaction card 126 and the secure application 150 may contemporaneously generate a security string based upon communications with the proximity security token 100, which information is communicated over one or more networks 156 to the card issuer, for example, the bank 153.

The bank 153 may then validate the security string generated from the proximity security token 100. If it is determined that the security string/proximity security token 100 is matched to the financial transaction card 126, i.e. both are shown by the bank's records to be owned by the user 102, the bank may generate an authentication code permitting the online or telephonic transaction to proceed. In certain embodiments, the authentication code so generated may be time limited. For example the code may be limited to a single transaction or for a selected duration, whichever occurs first.

As a preliminary matter, before the financial transaction card 126 is used, it may be associated with proximity security token 100. For example, when the user 102 is ready to use the financial transaction card 126, he may enter the card number into the secure application 150. The secure application 150 contacts the bank 153. The card issuer may then generate an encrypted key to query the proximity security token via the communications link 106, port 144 or other appropriate interface. The proximity security token 100 responds with a counter-key. The secure application 150 may then send the matched keys back to the bank 153. Other security and authentication schemes utilizing a physical proximity security token 100 are within the scope of this disclosure.

In use, assuming authentication is successful; the bank 153 sends an authentication string to the secure application 150. The user 102 now may, potentially over a limited amount of time, enter the card number and the authentication string into the payment field of the merchant 154. Additional security may be provided if the authentication string can only be used once, and/or expires after a pre-determined amount of time passes. It is possible that only the authentication string is needed, and in such an embodiment the authentication string may be automatically populated into an on-line payment window. With the foregoing methods, it is possible to issue a card with no numbers on the face for on-line sales.

Figure 7:
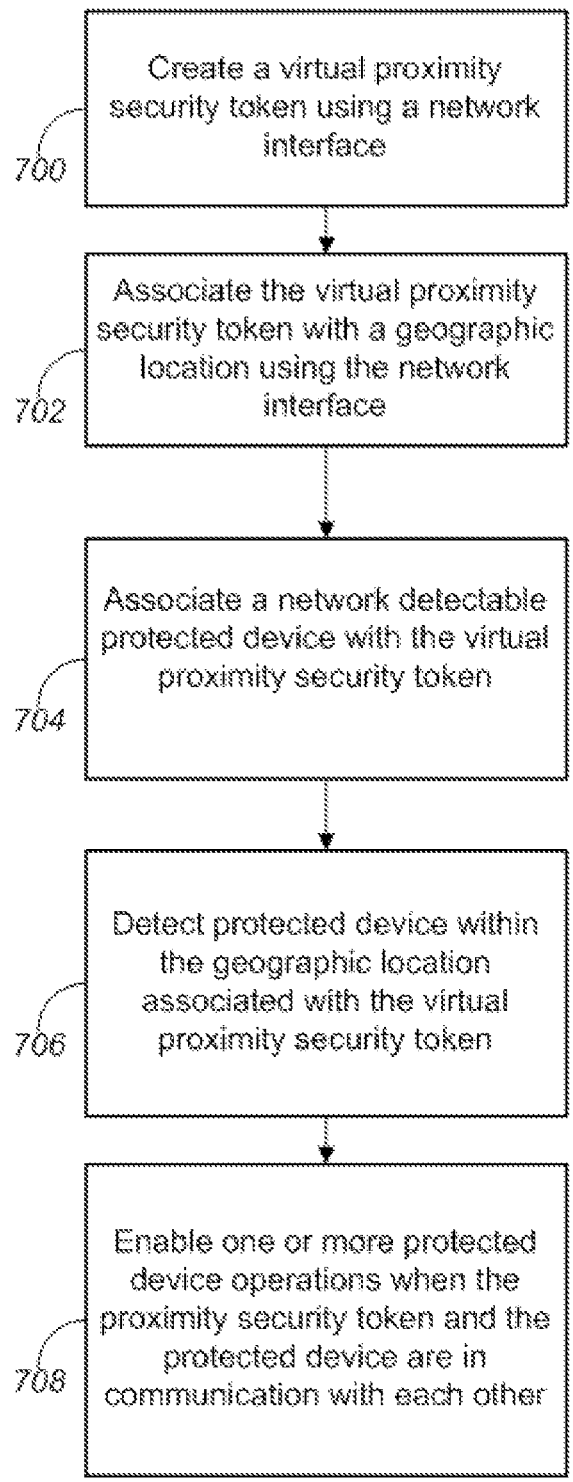
FIG. 7 is a flow diagram illustrating a method for providing security utilizing a virtual proximity security token.
Figure 8:
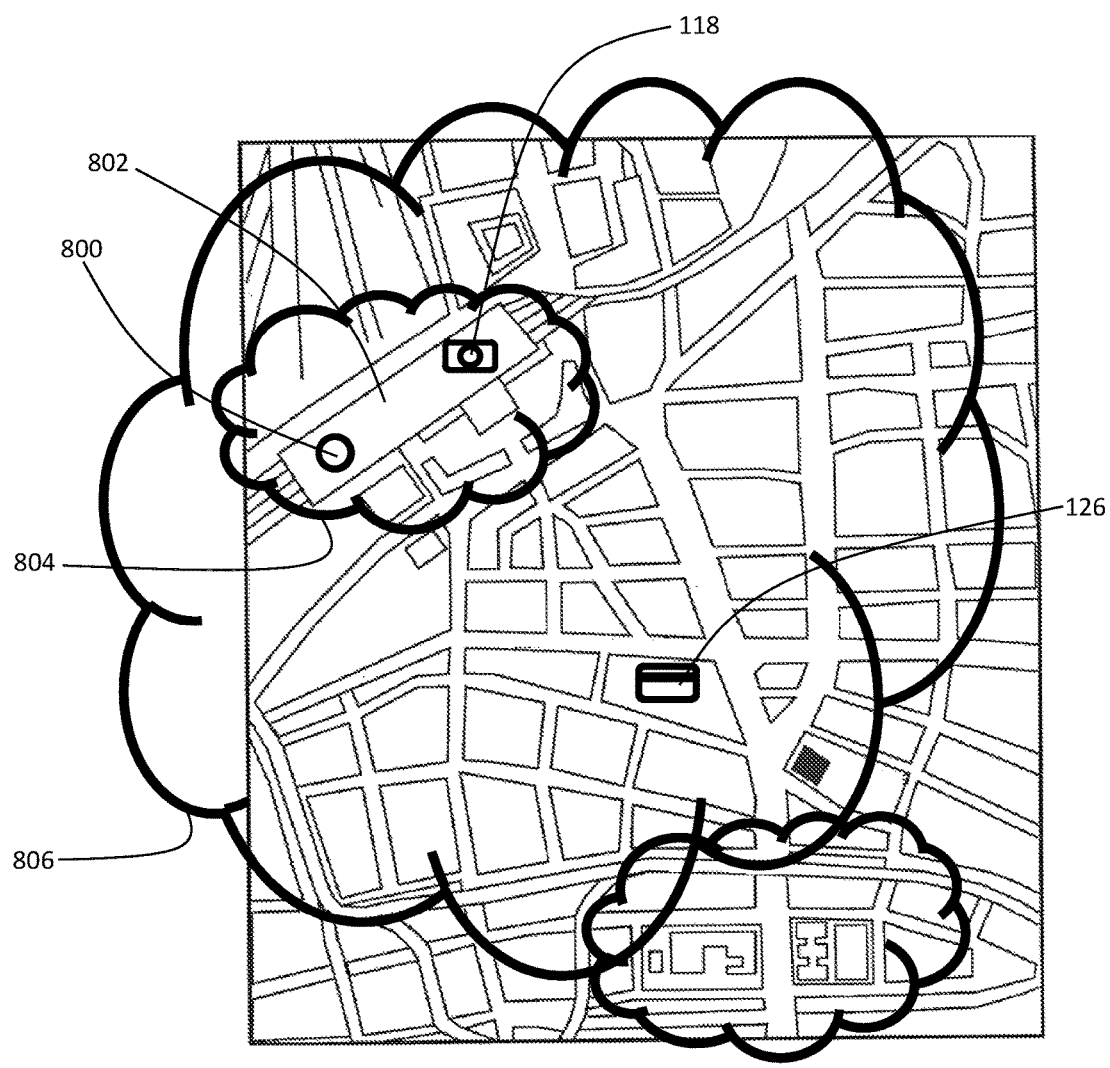
FIG. 8 is a schematic diagram illustrating a system for detecting the location of a protected device with respect to a virtual proximity security token.
Figure 9:
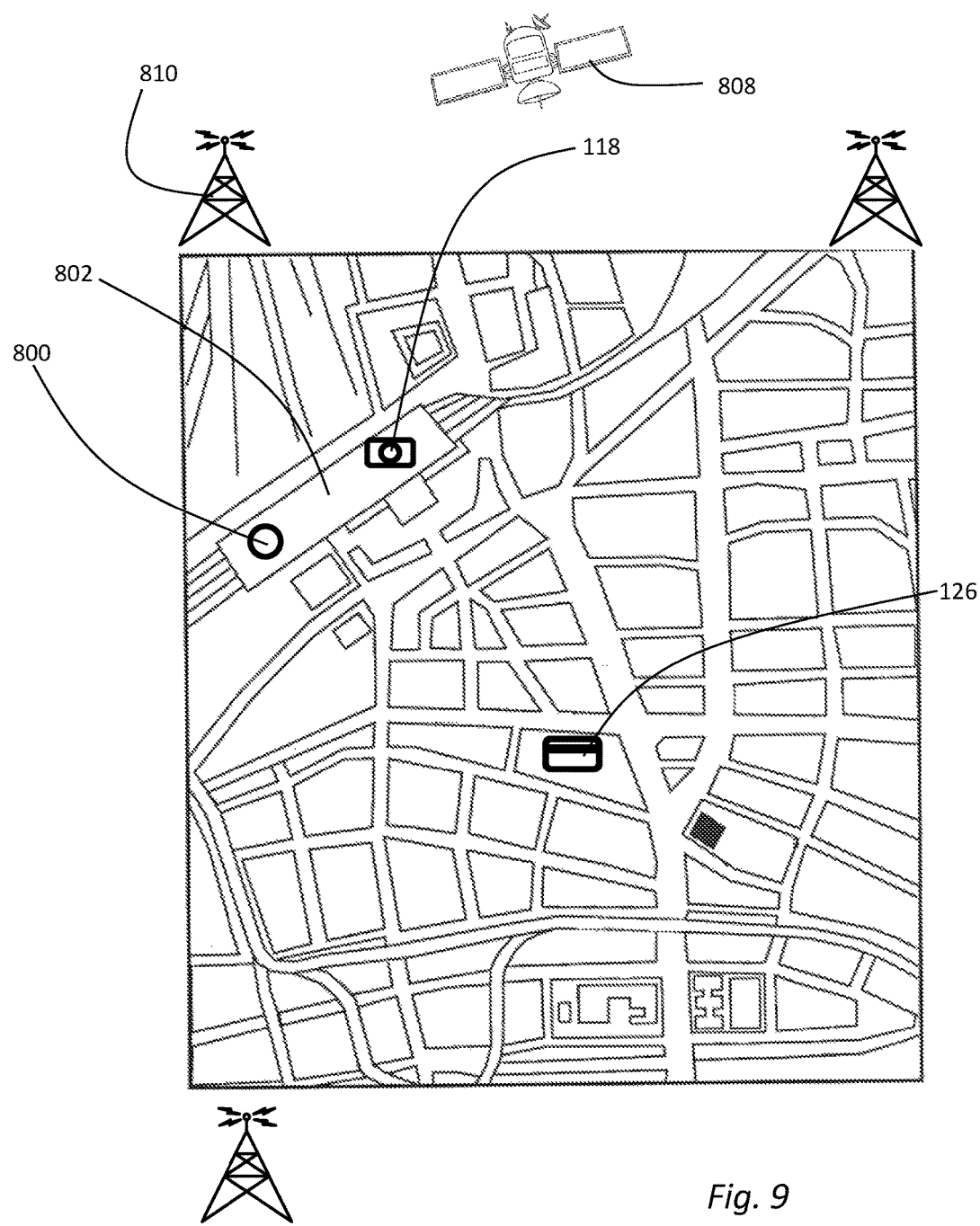
FIG. 9 is a schematic diagram illustrating an alternative or supplemental system for detecting the location of a protected device with respect to a virtual proximity security token.

Alternative embodiments include network implemented methods and systems utilizing virtual proximity security tokens. A virtual proximity token is a tag which is associated with a location or place using a computer, smart phone or other network accessing device and a mapping program. For example, as shown in FIGS. 7-9, a virtual proximity security token 800 may be created by a user using a network interface, for example a personal computer, smart phone, tablet or other device with network connectivity (FIG. 7, step 700). The virtual proximity security token 800 may be associated with a geographic location using the network interface (FIG. 7, step 702). For example, as shown on FIG. 8 the virtual proximity security token 800 may be associated with a train station located within a larger geographic region (a city). The virtual proximity security token 800 may be associated with the geographic location 802 initially by dragging and dropping the virtual proximity security token 800 onto a map program or through other means utilized by the user of the network interface.

Upon the association of the virtual proximity security token 800 with a geographic location 802, the virtual proximity security token will provide functionality similar to that described herein for a physical proximity security token 100. For example, a protected device 104, once associated with the virtual proximity security token 800 (FIG. 7, step 704) may be blocked from operation, disabled or have other security action taken if or when the protected device 104 is not detected within the geographic location 802 or is actively detected outside of the geographic location 802 (FIG. 7, step 706). The protected device 104 may be any type of protected device including an article of personal property or a financial transaction card as described above.

It is important to note that the protected device 104, or a protected device module 112 associated with the protected device, cannot typically communicate with a virtual proximity security token 800 using a communication link. Therefore, other means are required to detect the presence or absence of the protected device 104 at or away from the geographic location 802. Any means of tracking or determining device or person location may be used to implement the above methods. For example, as shown in FIG. 8, the geographic location 802 may be associated with a pico cell, femto cell 804, local area network, Wi-Fi network or other geographically-limited wireless network cell. The wireless functionality of the selected network cell may be implemented to detect the presence or absence of the protected device 104 at or near the geographic location 802. Larger cells, for example cellular network cell 806 may also be utilized to detect the location of the protected device 104 with respect to the virtual proximity security token 800.

Alternatively, as shown in FIG. 9, the location of the protected device 104 may be determined using other known techniques, including but not limited to communication between the protected device 104 and one or more global positioning system (GPS) satellites 808. Alternatively a cellular telephone network, represented by cell towers 810 may be utilized to triangulate or otherwise determine the location of the protected device 104 with respect to the virtual proximity security token 800.

With respect to the above examples, one protected device 104, represented by a camera 118 is detected to be located within the train station geographic location 802 and is thus enabled to be operational by communication between the protected device module 112 incorporated into the camera circuitry or attached thereto (FIG. 7, step 708). Another protected device, financial transaction card 126 is either not detected within the train station geographic location 802 or detected to be away from the train station geographic location 802, thus the various systems described herein can be engaged to disable data transfer to or from the financial transaction card 126. Therefore, virtual proximity security tokens 800 are useful to provide security from theft or loss. In addition, virtual proximity security tokens 800 can provide supplemental user control over certain items of personal property, for example virtual proximity security tokens 800 may be used to provide parental control of a child's use of financial transaction cards.

The user 102 may, with the user interface, associate multiple virtual proximity security tokens 800 with larger or smaller geographic locations and may move the proximity security tokens around or delete them as desired. Device operations may be enabled as described above when the protected device 104 is detected in the geographic region 802 defined by the virtual proximity token 800. In addition, any type of security action described herein, including but not limited to, alarms, supplemental tracking functionality or the disabling of one or more device operational features may be initiated when the protected device 104 is determined to be away from a designated virtual proximity security token 800. Virtual proximity security tokens may also be caused, through the user interface, to be engaged or otherwise activated before, during or after a designated time period or during a user selected combination of times and places.

Figure 10:
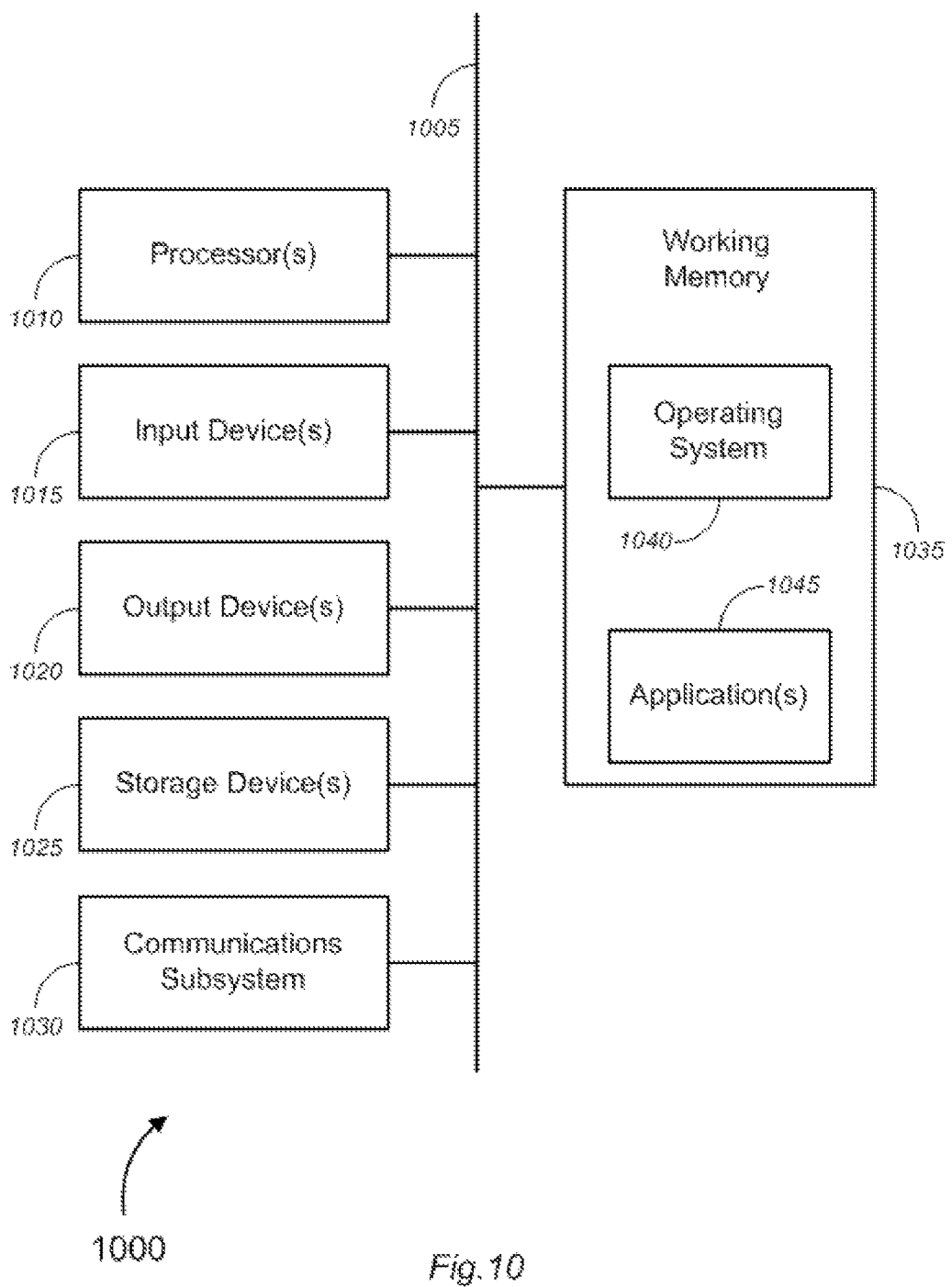
FIG. 10 is a block diagram illustrating an exemplary computer or system hardware architecture, in accordance with various embodiments.

We now turn to FIG. 10, which is a block diagram illustrating an exemplary computer architecture which is representative of any of the computer devices described herein. FIG. 10 provides a schematic illustration of one embodiment of a computer system 1000 that can perform the methods provided by various other embodiments, as described herein, and/or can perform the functions of any computer systems as described above. It should be noted that FIG. 10 is meant only to provide a generalized illustration of various components, of which one or more, or none, of each may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010, including without limitation one or more general-purpose processors, or one or more special-purpose processors such as digital signal processing chips, graphics acceleration processors, or the like; one or more input devices 1015, which can include without limitation a mouse, a keyboard, or the like; and one or more output devices 1020, which can include without limitation a display device, a printer, or the like.

The computer system 1000 may further include, or be in communication with, one or more storage devices 1025. The one or more storage devices 1025 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 1000 might also include a communications subsystem 1030, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 1030 may permit data to be exchanged with a network, with other computer systems, with any other devices described herein, or with any combination of network, systems, and devices. Any network might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 1000 will further comprise a working memory 1035, which can include a RAM or ROM device, as described above.

The computer system 1000 may also comprise software elements, shown as being currently located within the working memory 1035, including an operating system 1040, device drivers, executable libraries, or other code. The software elements may include one or more application programs 1045, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 1025 described above. In some cases, the storage medium might be incorporated within a computer system, such as the system 1000. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 1000, or might take the form of source or installable code. The source or installable code, upon compilation, installation, or both compilation and installation, on the computer system 1000 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 1000, to perform methods in accordance with various embodiments of the invention. According to a set of embodiments, some or all of the procedures of such methods might be performed by the computer system 1000 in response to processor 1010 executing one or more sequences of one or more instructions. The one or more instructions might be incorporated into the operating system 1040 or other code that may be contained in the working memory 1035, such as an application program 1045. Such instructions may be read into the working memory 1035 from another computer readable medium, such as one or more of the storage devices 1025. Merely by way of example, execution of the sequences of instructions contained in the working memory 1035 might cause the one or more processors 1010 to perform one or more procedures of the methods described herein.

The terms "machine readable medium" and "computer readable medium," as used herein, refer to any medium that participates in providing data that causes a machine to operate in a specific fashion. In an embodiment implemented using the computer system 1000, various computer readable media might be involved in providing instructions or code to the one or more processors 1010 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030, or the media by which the communications subsystem 1030 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 11:
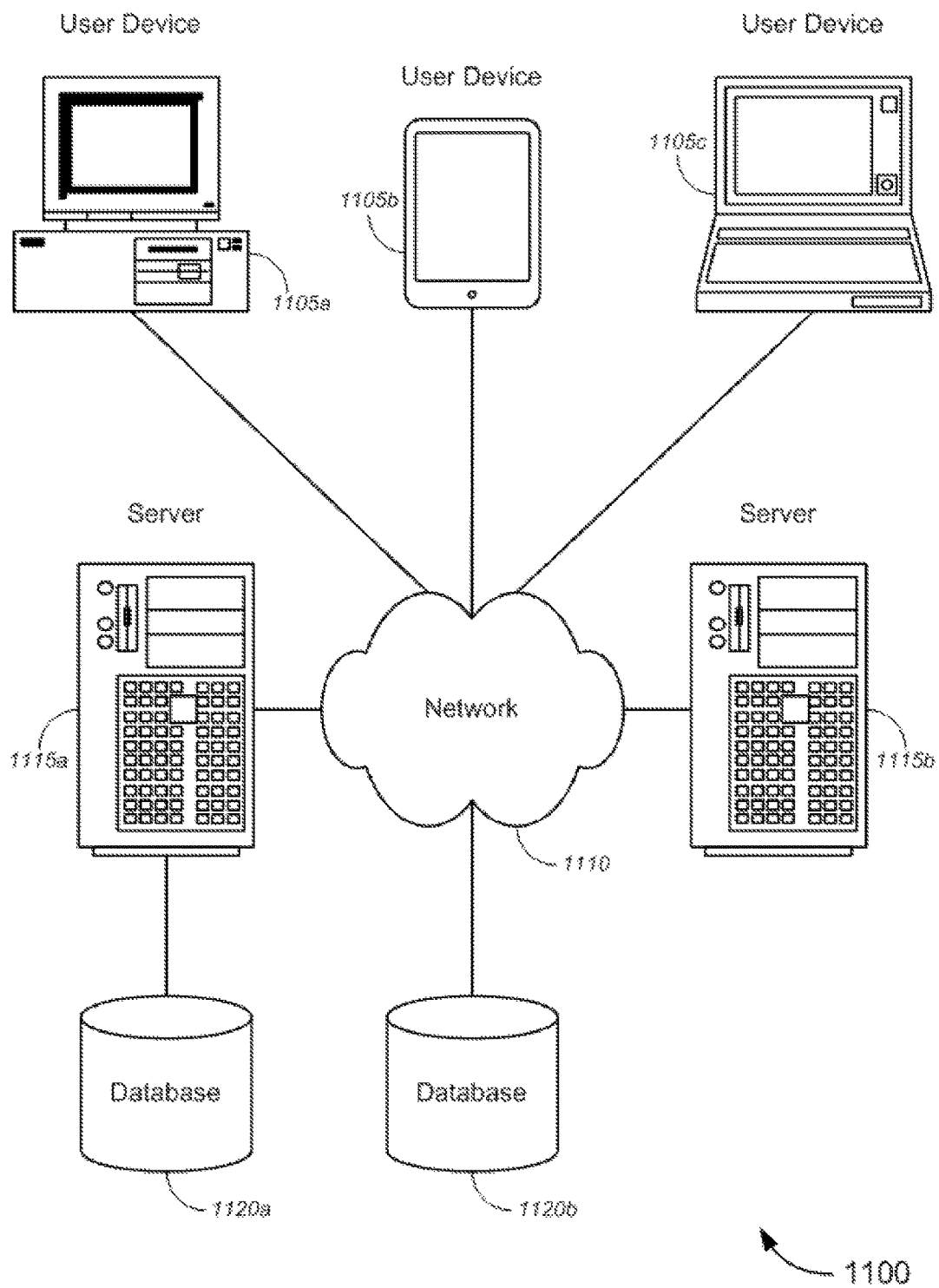
FIG. 11 is a block diagram illustrating a networked system of computers, which can be used in accordance with various embodiments.

As noted above, a set of embodiments comprises methods and systems for testing performance of network components. FIG. 11 illustrates a schematic diagram of a system 1100 that can be used in accordance with one set of embodiments. The system 1100 can include one or more user computers or user devices 1105. A user computer or user device 1105 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 1105 can also have any of a variety of applications, including one or more applications configured to perform methods provided by various embodiments (as described above, for example), as well as one or more office applications, database client and/or server applications, and/or web browser applications. Alternatively, a user computer or user device 1105 can be any other electronic device, such as a thin-client computer, Internet-enabled mobile telephone, and/or personal digital assistant, capable of communicating via a network (e.g., the network 1110 described below) and/or of displaying and navigating web pages or other types of electronic documents. Although the exemplary system 1100 is shown with three user computers or user devices 1105, any number of user computers or user devices can be supported.

Certain embodiments operate in a networked environment, which can include a network 1110. The network 1110 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 1110 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1115. Each of the server computers 1115 may be configured with an operating system, including without limitation any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 might be a data server, as described above. The data server might include (or be in communication with) a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™ Microsoft™, Sybase™, IBM™ and the like, which can process requests from clients (including, depending on the configuration, dedicated database clients, API clients, web browsers, etc.) running on a user computer or user device 1105 and/or another server 1115. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer or user device 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120. The location of the database(s) 1120 is discretionary: merely by way of example, a database 1120a might reside on a storage medium local to (and/or resident in) a server 1115a (and/or a user computer or user device 1105). Alternatively, a database 1120b can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1120 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A security method comprising:
   providing a proximity security token;
   providing an article of personal property having electronic functionality that is physically separate from the proximity security token;
   providing a communications link between the proximity security token and the article of personal property, wherein the communications link provides for communication between the proximity security token and the article of personal property within a selected communications range;
   activating the communications link to place the proximity security token into communication with the article of personal property;
   enabling an electronic operation of the article of the personal property when the proximity security token and the article personal property are in communication with each other;
   disabling the electronic operation of the article of personal property when communications between the proximity security token and the article of personal property are interrupted; and
   causing the article of personal property to transmit a tracking signal when communications between the proximity security token and the article of personal property are interrupted.

2. The method of claim 1 further comprising:
   enabling the electronic operation of the article of the personal property when the proximity security token and the protected device are in communication with each other during a pre-defined time period; and
   disabling the electronic operation of the article of personal property before or after the pre-defined time period.

3. The method of claim 1 further comprising triggering an alarm associated with the proximity security token when communications between the proximity security token and the article of personal property are interrupted.

4. The method of claim 1, wherein the step of disabling the electronic operation of the article of personal property comprises preventing the article of personal property from powering on.

5. The method of claim 1 wherein the communications link between the proximity security token and the article of personal property is a wireless communications link.

6. The method of claim 1 wherein the proximity security token is a physical device, the method further comprising concealing the proximity security token within an article of clothing.

7. The method of claim 1 wherein the proximity security token is a virtual device and the communications link is a network communications link, the method further comprising:
   virtually associating the proximity security token, through a user interface in communication with the network, with a geographic region; and
   detecting the presence of the article of personal property within the geographic region.

8. A system comprising:
   a proximity security token comprising a wireless communications module; and
   an article of personal property which is physically separate from the proximity security token, the article of personal property having electronic functionality, said article of personal property comprising a protected device module in wireless communication with the wireless communications module of the proximity security token, wherein the wireless communications module and the protected device module provides for wireless communication between the proximity security token and the article of personal property within a selected communications range, and wherein the protected device module enables an electronic operation of the article of the personal property when the proximity security token and the article personal property are in communication with each other, and wherein the protected device module further disables the electronic operation of the article of personal property and causes the article of personal property to transmit a tracking signal when communications between the proximity security token and the article of personal property are interrupted.

9. The system of claim 8, wherein the protected device module enables the electronic operation of the article of the personal property when the proximity security token and the protected device are in communication with each other during a pre-defined time period, and disables the electronic operation of the article of personal property before or after the pre-defined time period.

10. The system of claim 8, wherein the protected device module triggers an alarm associated with the proximity security token when communications between the proximity security token and the article of personal property are interrupted.

11. The system of claim 8, wherein the protected device module disables the electronic operation of the article of personal property by preventing the article of personal property from powering on.

12. An apparatus comprising:
    a proximity security token;
    an article of personal property having electronic functionality that is physically separate from the proximity security token;
    a processor associated with at least one of the proximity security token and the article of personal property; and
    a non-transitory readable medium having encoded thereon a set of instructions that, when executed by the processor, causes the apparatus to perform one or more operations for providing device security, the set of instructions comprising:
      instructions for providing a communications link between the proximity security token and the article of personal property, wherein the communications link provides for communication between the proximity security token and the article of personal property within a selected communications range;

instructions for activating the communications link to place the proximity security token into communication with the article of personal property;
instructions for enabling an electronic operation of the article of the personal property when the proximity security token and the article personal property are in communication with each other;
instructions for disabling the electronic operation of the article of personal property when communications between the proximity security token and the article of personal property are interrupted; and
instructions for causing the article of personal property to transmit a tracking signal when communications between the proximity security token and the article of personal property are interrupted.

13. The apparatus of claim 12, the set of instructions further comprising:
instructions for enabling the electronic operation of the article of the personal property when the proximity security token and the protected device are in communication with each other during a pre-defined time period; and
instructions for disabling the electronic operation of the article of personal property before or after the pre-defined time period.

14. The apparatus of claim 12, the set of instructions further comprising instructions for triggering an alarm associated with the proximity security token when communications between the proximity security token and the article of personal property are interrupted.

15. The apparatus of claim 12, the set of instructions further comprising instructions for preventing the article of personal property from powering on.

16. The apparatus of claim 12 wherein the proximity security token is a virtual device and the communications link is a network communications link, the instructions further comprising:
instructions for virtually associating the proximity security token, through a user interface in communication with the network, with a geographic region; and
instructions for detecting the presence of the article of personal property within the geographic region.

* * * * *